US006362573B1

United States Patent
Helbing et al.

(10) Patent No.: US 6,362,573 B1
(45) Date of Patent: Mar. 26, 2002

(54) APPARATUS AND METHOD FOR MONITORING THE LIFE OF ARC LAMP BULBS

(75) Inventors: Rene Helbing; Barclay J. Tullis, both of Palo Alto; Ken A. Nishimura, Fremont, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/539,489

(22) Filed: Mar. 30, 2000

(51) Int. Cl.[7] .............................................. H05B 37/02
(52) U.S. Cl. ..................... 315/155; 315/149; 315/308
(58) Field of Search .................... 315/149–159, 315/224, 225, 307, 308, 291, 362

(56) References Cited

U.S. PATENT DOCUMENTS 5,463,287 A * 10/1995 Kurihara et al. ............. 315/291
6,127,789 A * 10/2000 Ishizuka et al. ............. 315/308
6,150,775 A * 11/2000 Kau ............................ 315/308

* cited by examiner

*Primary Examiner*—Don Wong
*Assistant Examiner*—Wilson Lee

(57) ABSTRACT

An apparatus and method are described for monitoring the life of an arc lamp bulb. The apparatus includes a memory that stores a threshold property value. An arc lamp bulb property sensor acquires a current arc lamp bulb property value. A control circuit compares the current arc lamp bulb property value with the threshold property value. The control circuit generates an end-of-life notification signal when the current arc lamp bulb property value meets the threshold property value.

22 Claims, 8 Drawing Sheets

US 6,362,573 B1

APPARATUS AND METHOD FOR MONITORING THE LIFE OF ARC LAMP BULBS

TECHNICAL FIELD

The invention is generally related to arc lamp bulbs and, more particularly, to an apparatus and method for monitoring the life of arc lamp bulbs.

BACKGROUND OF THE INVENTION

Arc lamp bulbs are a common light source for many optical systems, such as front and rear projection systems. Arc lamp bulbs exhibit high efficiency, good color balance and good geometric matching to the optical systems.

However, the lifetime of a typical arc lamp bulb is usually between 2,000 and 8,000 operating hours, depending on the manufacturer, output power, filling of the lamp, etc. This lifetime is considerably less than the lifetime of systems and apparatus in which the arc lamp bulb is integrated, e.g., monitors, TVs and projectors. In addition, the above lifetime values are averages and part-to-part variations are quite significant.

Thus, it is difficult to predict when an arc lamp bulb will burn out, making it difficult to know when the arc lamp bulb should be replaced. Furthermore, due to this lack of predictability, burn out of an arc lamp bulb is often unexpected, and a user may not have a replacement bulb on hand when the arc lamp bulb burns out.

Thus, an unaddressed need exists for an apparatus or method that accurately predicts the remaining life of an arc lamp bulb, to enable the user to obtain a spare arc lamp bulb prior to the failure of the current arc lamp bulb.

SUMMARY OF THE INVENTION

The invention provides an apparatus and method for monitoring the life of arc lamp bulbs.

Briefly described, in architecture, the apparatus can be implemented as follows. The apparatus for monitoring arc lamp bulbs includes (1) a memory for storing a predetermined threshold property value for an arc lamp bulb; (2) an arc lamp bulb property value sensor for acquiring a current arc lamp bulb property value; and (3) a control circuit for comparing the current arc lamp bulb property value with the predetermined threshold property value, and generating an end-of-life notification signal when the current arc lamp bulb property value meets the predetermined threshold property value.

The invention can also be viewed as providing a method for monitoring the life of arc lamp bulbs. The method can be broadly summarized by the following steps: (1) acquiring a predetermined threshold property value for an arc lamp bulb; (2) acquiring a current arc lamp bulb property value; (3) comparing the current arc lamp bulb property value with the predetermined threshold property value; and (4) generating an end-of-life notification signal when the current arc lamp bulb property value meets the predetermined threshold property value.

The invention provides an end-of-life notification signal, indicating that the arc lamp bulb should be replaced, close to the end of the useful life of the arc lamp bulb, but before the bulb actually burns out. The threshold property value is chosen to correspond to a point in the life of the arc lamp bulb that precedes the actual burn out of the bulb.

In an embodiment, in acquiring a current arc lamp bulb property value, more than one current property of the arc lamp bulb can be acquired, and, in comparing each current arc lamp bulb property value with a respective predetermined threshold property value, an end-of-life signal can be generated if any of the comparisons indicates an acquired property value has reached its predetermined threshold value. Alternatively, when values are acquired for more than one property value, the value of an expression involving these acquired values can itself be compared with a corresponding predetermined threshold value.

Other features and advantages of the invention will become apparent upon examination of the following drawings and detailed description. It is intended that all such additional features and advantages be included herein within the scope of the invention.

BRIEF DESCRIPTION OF THE DRAWINGS

The invention can be better understood with reference to the following drawings. The components in the drawings are not necessarily to scale, emphasis instead being placed upon clearly illustrating the principles of the invention. Moreover, in the drawings, like reference numerals designate corresponding parts throughout the several views.

DETAILED DESCRIPTION OF THE PREFERRED EMBODIMENT

Figure 1:
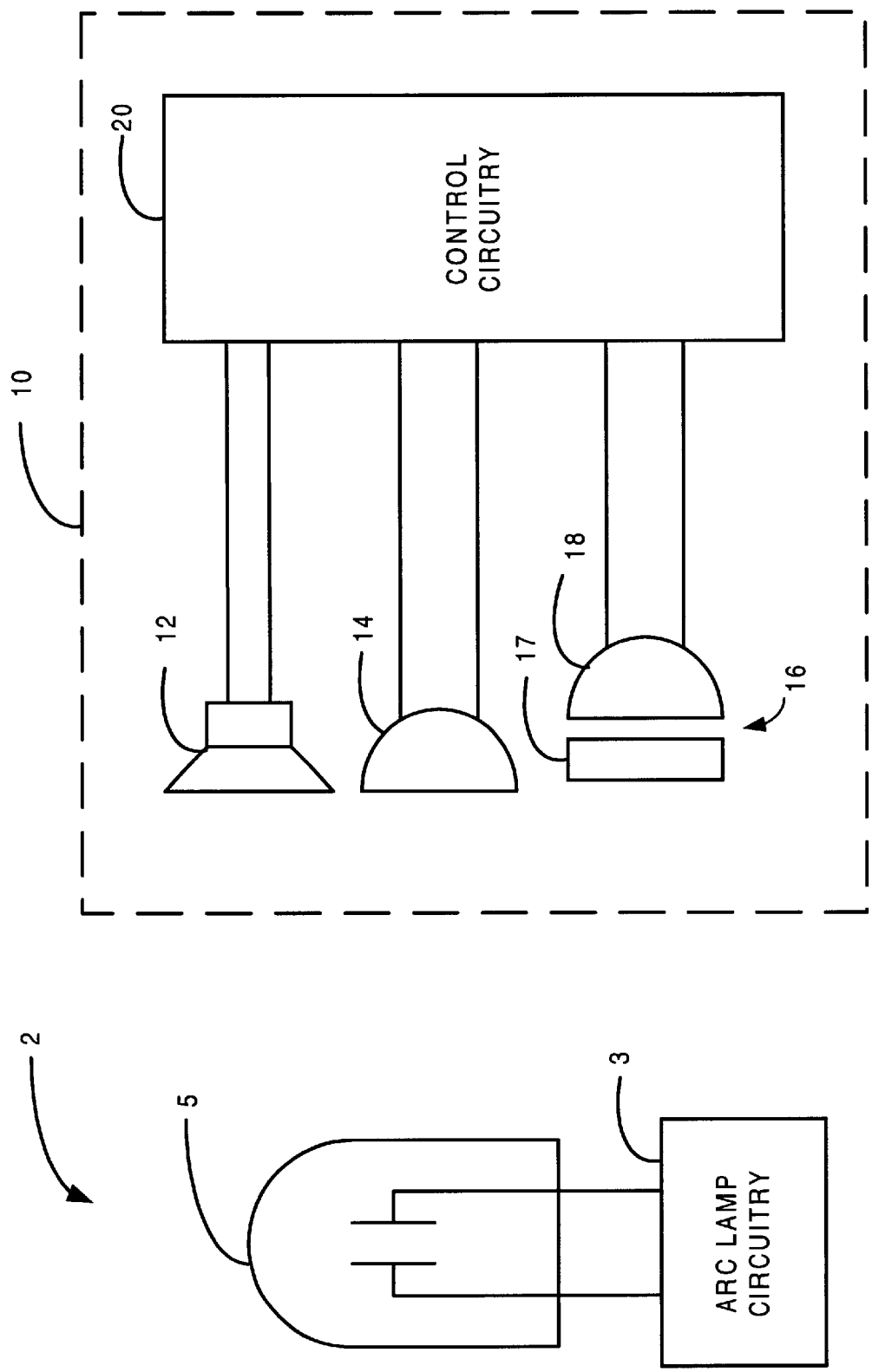
FIG. 1 is a block diagram of an example of an apparatus for monitoring the life of arc lamp bulbs.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the scope of the invention as defined by the appended claims.

FIG. 1 is a block diagram of an apparatus 10 of the invention for monitoring the life of an arc lamp bulb installed in the arc lamp apparatus 2. The arc lamp apparatus 2 includes arc lamp circuit 3 and an arc lamp bulb 5. The arc lamp monitoring apparatus 10 of the invention includes the control circuit 20 and at least one arc lamp bulb property value sensor 12, 14 and 16.

The control circuit 20 obtains the current arc lamp bulb property from at least one of the arc lamp bulb property value sensors 12, 14 and 16. The arc lamp bulb property value sensors 12, 14 and 16 shown in FIG. 1 include, but are not limited to, sensors that detect at least one of the following properties: the arc lamp bulb temperature 12; the voltage drop across the bulb; the current through the bulb; the electrical impedance of the bulb; the total light output of arc lamp bulb 14; the spectral distribution of light or the light intensity in a particular wavelength range or ranges 16. The arc lamp bulb property sensor transmits arc lamp bulb property values indicating the detected arc lamp bulb property to the control circuit 20, which processes the arc lamp bulb property values according to the techniques described below.

The arc lamp bulb property sensors 12, 14 and 16 can be used individually to detect one or more arc lamp bulb property values. Additionally or alternatively, the control circuit 20 can process the arc lamp bulb property values generated by two or more of the arc lamp bulb property sensors to generate a calculated arc lamp bulb property value. For example, one arc lamp bulb property sensor can measure the voltage across the arc lamp bulb as an arc lamp property value and another arc lamp bulb property sensor can measure the current through the arc lamp bulb as an arc lamp bulb property value. The control circuit would then divide the measured voltage by the measured current to generate the impedance of the arc lamp bulb as the calculated arc lamp bulb property. Alternatively, measured voltage and current can be used to generate the resistance of the arc lamp bulb, or resistance can be obtained from calculated impedance. The impedance or resistance of the arc lamp bulb is a useful arc lamp bulb property since it increases towards the end of the life of the arc lamp bulb.

As a further example, the above-described arc lamp property sensors that measure voltage and current can be used in conjunction with a third arc lamp property sensor that measures the total light output of the arc lamp bulb. The control circuit 20 can then multiply the arc lamp bulb property values for voltage and current to determine the power input of the arc lamp bulb, and divide the arc lamp bulb property value for total light output by the product of the arc lamp bulb property values for voltage and current to determine the efficiency of the arc lamp bulb as a calculated arc lamp bulb property. The efficiency of the arc lamp bulb is a useful arc lamp bulb property since it decreases towards the end of the life of the arc lamp bulb.

Additionally or alternatively, the control circuit 20 can process the arc lamp bulb property values received from the arc lamp bulb property sensors or can further process the calculated arc lamp bulb property values, described above, to obtain first or second temporal derivatives of the arc lamp bulb properties exemplified above. Further details of how the control circuit processes the arc lamp bulb property values will be provided below with reference to FIGS. 6A and 6B.

In an arc lamp apparatus 2 in which the electric power to the arc lamp bulb 5 is unregulated, an arc lamp bulb property sensor would be additionally provided to measure the voltage across the arc lamp bulb. In this case, the control circuit 20 would normalize such of the arc lamp bulb property values as are voltage-dependent in accordance with the measured voltage across the arc lamp bulb. This would prevent variations in the a.c. line voltage during operation of the arc lamp bulb from causing the control circuit to signal for replacement of the arc lamp bulb prematurely, or to fail to signal for replacement of the arc lamp bulb when failure of the arc lamp bulb was imminent.

Arc lamp bulb property sensors that measure the voltage across the arc lamp bulb and the current through the arc lamp bulb may be provided in lieu of a single arc lamp bulb property sensor that measures the voltage across the arc lamp bulb. In this case, the control circuit 20 would normalize the measured arc lamp bulb property values in accordance with the power input to the arc lamp bulb. The control circuit would calculate the power input from the measurements of voltage and current.

Figure 2:
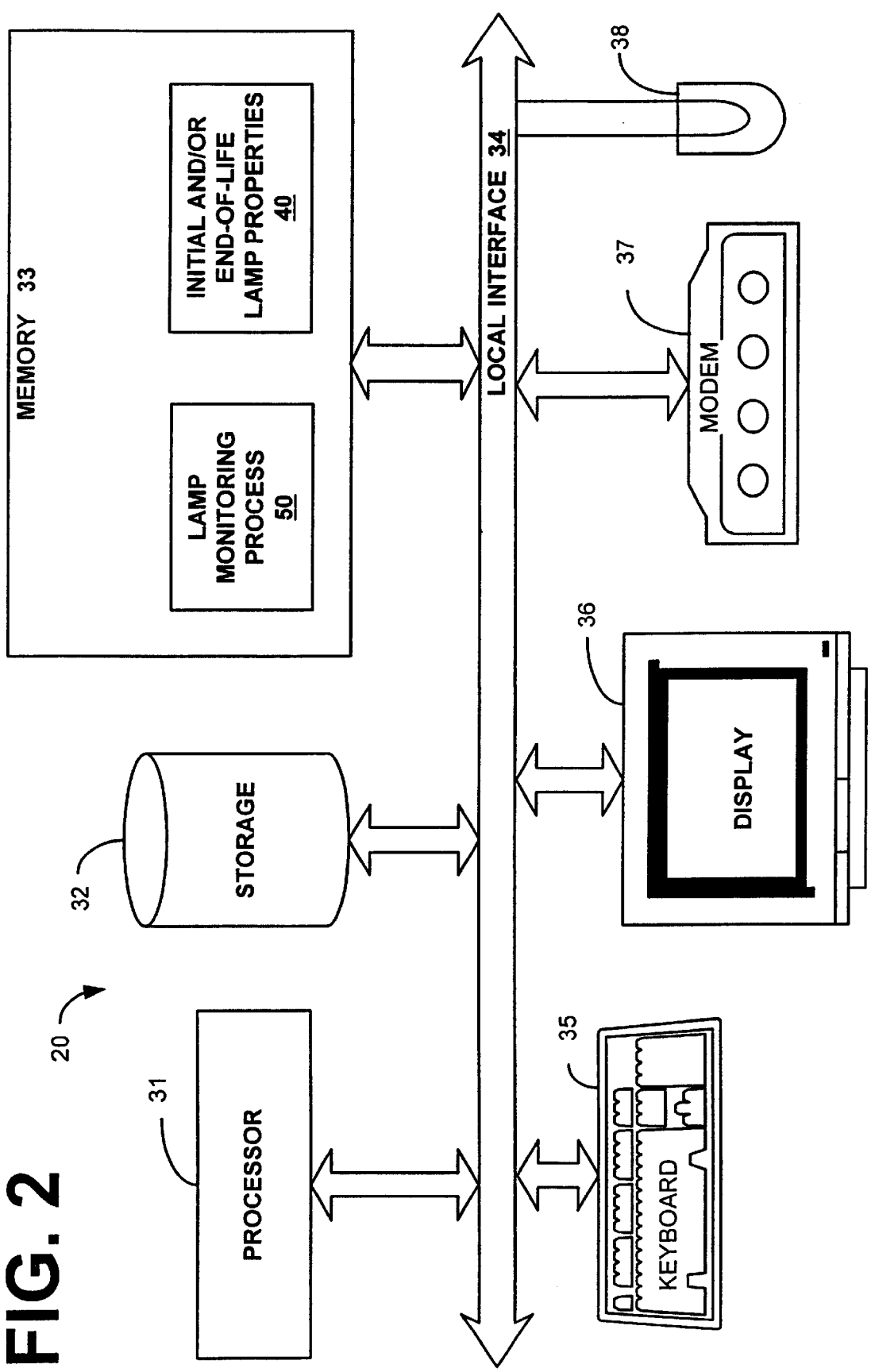
FIG. 2 is a block diagram of an example of a control circuit for monitoring the life of arc lamp bulbs as shown in FIG. 1.

FIG. 2 is a block diagram of an example of control circuit 20 that includes storage elements for storing arc lamp bulb property values including, but not limited to, initial arc lamp bulb property values, current arc lamp bulb property values and statistical end-of-life arc lamp bulb property values, which will be described in further detail below. The control circuit 20 preferably includes a processor 31, storage 32 and a memory 33. Storage 32 or memory 33 can be any known type of computer data storage that includes, but is not limited to: RAM, ROM, EPROM, EEPROM, PROM, Flash memory, disk, tape or CD-ROM, etc. The processor 31 accepts data from the memory 33 over a local interface 34. Outputs, including arc lamp bulb property values detected by any of the sensors 12, 14 and 16, may be displayed on the optional display 36 or light indicator 38. The control circuit 20 can also be implemented using non-processor circuitry. Examples of how the control circuit processes the arc lamp bulb property values are described in further detail below with reference to FIGS. 6A and 6B.

The control circuit 20 also may include a modem or network card 37 if the system 10 using the arc lamp apparatus 2 is connected to a network. The modem or network card 37 may be used to establish communication with a computer (not shown) on a network (not shown) to order a replacement arc lamp bulb. The control circuit 20 may initiate an automatic order of a replacement arc lamp bulb when the control circuit detects that the current arc lamp bulb property value is approaching the statistical end-of-life arc lamp bulb property value.

Figure 3:
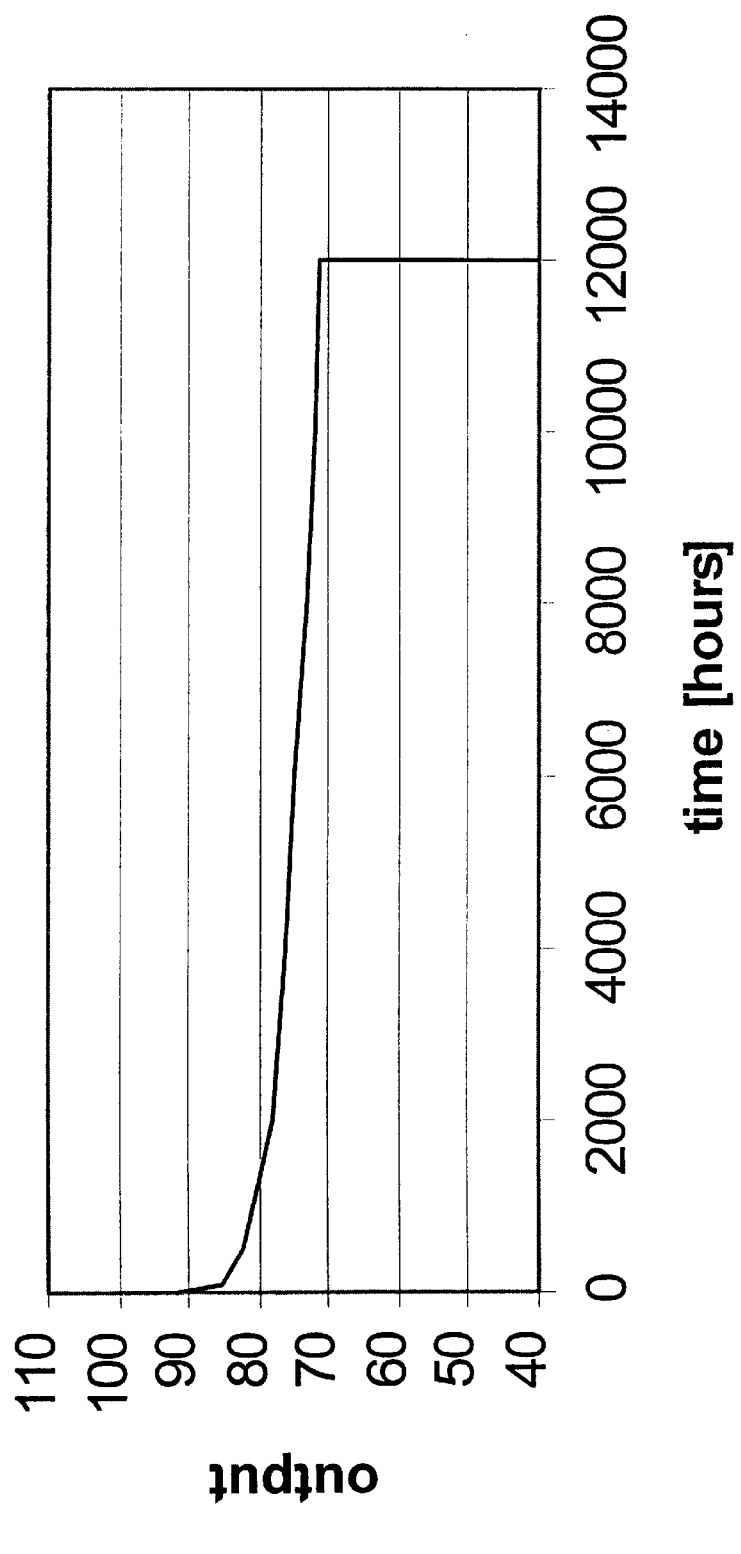
FIG. 3 is a graph of an example of output over time properties for an arc lamp bulb.

Shown in FIG. 3 is an example of a graph 41 of the output light intensity versus time for a typical arc lamp bulb 5. As can be seen in the graph 41, the light intensity is a percentage of the initial intensity of arc lamp bulb 5 and decreases over time. This change in the arc lamp light intensity output can be monitored by using a photodiode as sensor 14, and can be compared to stored initial and expected end-of-life intensity values (e.g., the intensity value measured at the beginning of the life of the arc lamp bulb and the intensity value predicted for end of the life of the arc lamp bulb). If the monitored value falls below a certain percentage of the stored initial intensity value, the control circuit generates an end-of-life signal indicating the suggested change of the arc lamp. The end-of-life signal could cause illumination of LED 38 or cause a predetermined message to be displayed by display 36.

However, as shown in FIG. 3, the changes in the output light intensity that occur near the end of the life of the arc lamp bulb are rather gradual and may change too slowly to provide an accurate prediction of the life of the arc lamp bulb. Therefore, monitoring color change in the light output or monitoring the light output at certain wavelengths or in one or more wavelength ranges is advantageous. This may be done, for example, by comparing the light output at different wavelengths, or by comparing the light output at one or more wavelengths, or in a narrow range of wavelengths, with the light output in a broader range of wavelengths, which may or may not overlap.

Figure 4:
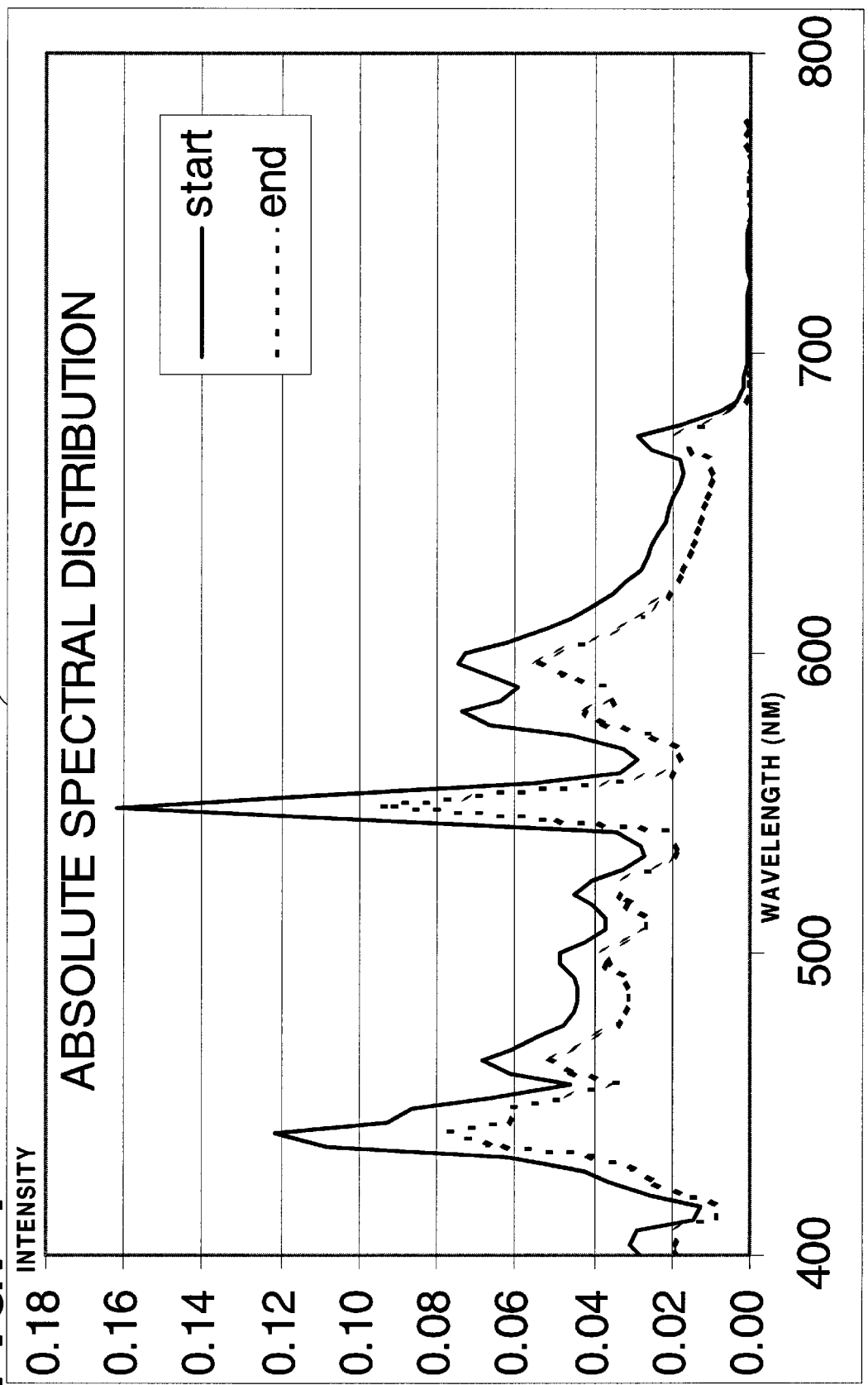
FIG. 4 is a graph of an example of the absolute color and intensity changes that arc lamp bulbs undergo throughout their lifetime.
Figure 5:
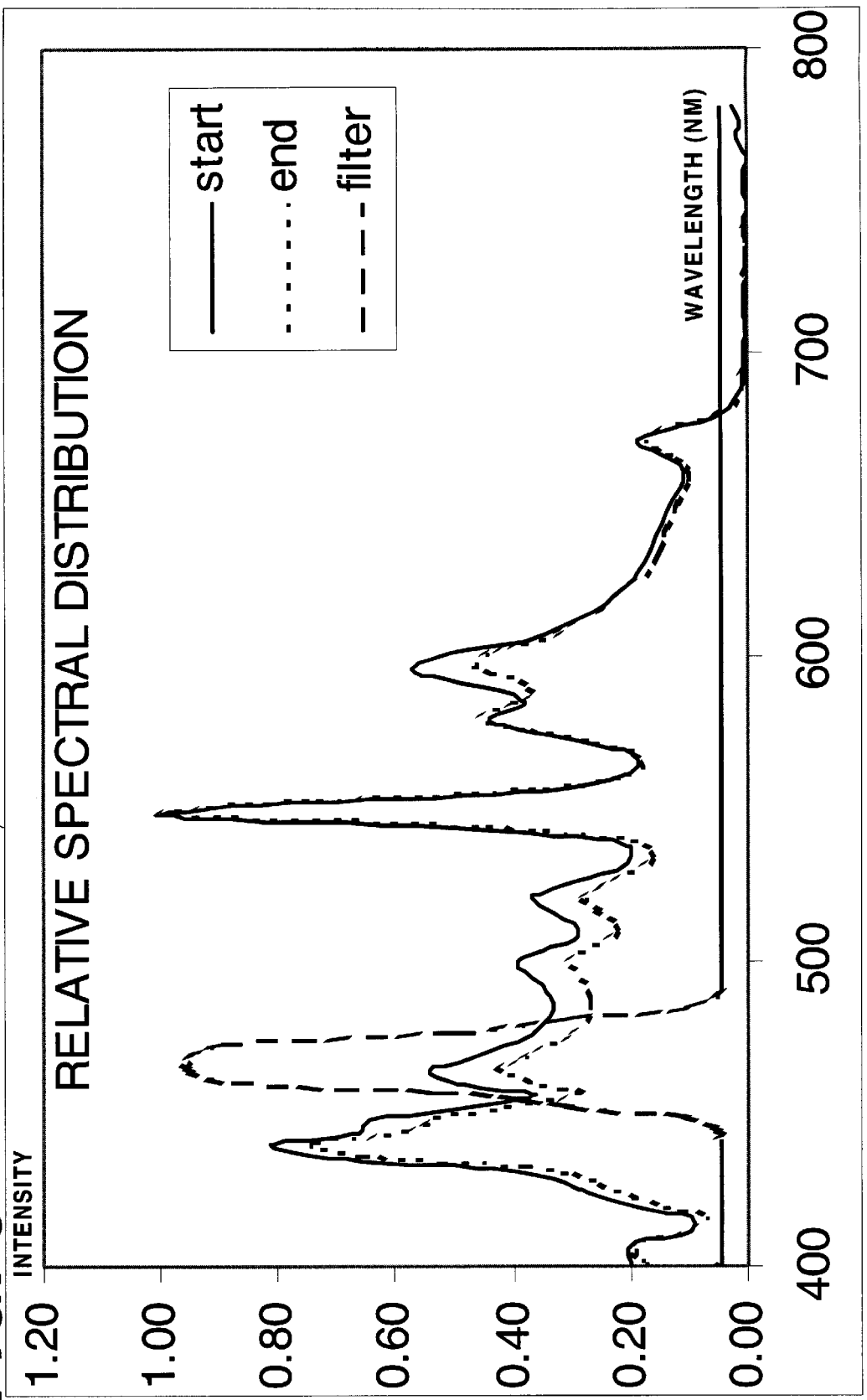
FIG. 5 is a graph of an example of the relative color and intensity changes that arc lamp bulbs undergo throughout their lifetime.

FIG. 4 is a graph 42 showing an example of the absolute spectral power distribution of an arc lamp bulb near the beginning and near the end of its life. The average intensity, and hence the total light output, has decreased over time. However, not all areas in the spectrum have decreased by the same amount. This difference can be monitored by using one or more sensors, such as a wavelength-specific sensor 16 that includes a photodiode 18 and a color filter 17. The color filter 17 passes light of a specified wavelength range or ranges, thereby allowing the photodiode 18 to monitor the light output in such discrete wavelength range or ranges. FIG. 5 is a graph 43 showing an example of the relative spectrum of the light emitted by an arc lamp bulb near the beginning of its life, and the relative spectrum of the light emitted by the arc lamp bulb near the end of its life. The spectra are normalized so that the intensity value at the wavelength of maximum absolute intensity corresponds to 1.00. In this example, the maximum intensity occurs at approximately 550 nm in both spectra. The spectra show that the intensity of the light emitted in some wavelength ranges, e.g., around 450–500 nm, has decreased more than the average.

This makes it possible to monitor only one of these wavelength ranges by placing an appropriate optical filter 17 in front of the photodiode 18, as shown in FIG. 1. The spectral transmission characteristic of this filter 17 is also shown in FIG. 5. Monitoring only this particular wavelength range allows the control circuit 20 to see bigger differences between initial property value and current arc lamp bulb property value near the end of the life of the arc lamp bulb. This makes it simpler and more accurate to predict when arc lamp bulb 5 will burn out. Moreover, the output of sensor 18 can be compared with that of sensor 12 or with the outputs of other sensors similar to sensor 18 with filters having different spectral characteristics.

Figure 6A:
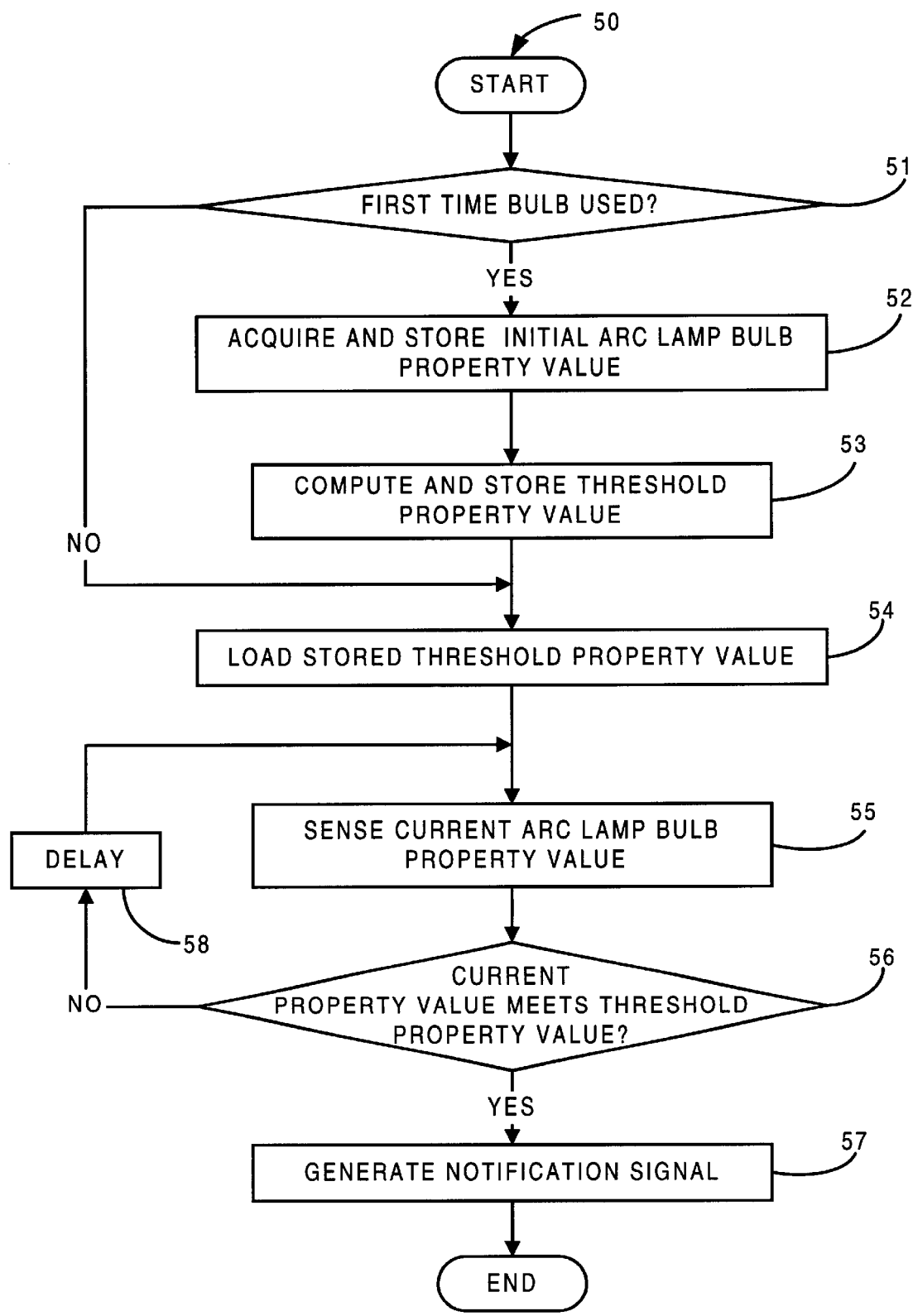
FIG. 6A is a flow chart of a first example of the lamp monitoring process performed in the control circuit shown in FIG. 1.

FIG. 6A is a flow chart depicting a first example of the lamp monitoring process 50 performed in the control circuit 20 (FIGS. 1 and 2). This example of the lamp monitoring process will now be described with reference to FIG. 6A, and with additional reference to FIGS. 1 and 2. First, at step 51, the lamp monitoring process 50 determines whether this is the first time the arc lamp bulb 5 has been used. When the lamp monitoring process 50 determines that this is not the first time the arc lamp bulb 5 has been used, the lamp monitoring process 50 proceeds to step 54, which will be described below.

In step 51, determining whether this is the first time the arc lamp bulb 5 has been used can be done in a number of different ways. For example, a test may be performed to determine if an initial arc lamp bulb property value exists in storage 32 or in memory 33. No initial arc lamp bulb property value existing in storage 32 or in memory 33 indicates that this is the first time the arc lamp bulb has been used. As another example, if an initial arc lamp bulb property value exists in storage 32 or in memory 33, an initial arc lamp bulb property value may be acquired in a manner similar to that to be described below with reference to step 52. The acquired initial arc lamp bulb property value may be compared to the initial arc lamp bulb property value that exists in storage 32 or in memory 33. The acquired initial arc lamp bulb property value being greater than the initial arc lamp bulb property value that exists in storage 32 or in memory 33 indicates that this is the first time the arc lamp bulb has been used.

When it is determined at step 51 that this is the first time the arc lamp bulb 5 as been used, the lamp monitoring process 50 advances to step 52, where it acquires an initial arc lamp bulb property value from at least one of the sensors 12, 14, 16, and stores the initial arc lamp bulb property value in storage 32 or in memory 33. As noted above, initial arc lamp bulb property values from more than one of the sensors may be acquired and processed by the control circuit 20 to generate the initial arc lamp bulb property value that is stored in storage 32 or memory 33. The processing may include normalizing for the electrical power or voltage input to the arc lamp bulb.

At step 53, the lamp monitoring process 50 computes the threshold property value from the initial arc lamp bulb property value and stores the threshold property value in storage 32 or memory 33. The threshold property value can be, but is not limited to, the total light output, the spectral distribution of the light output, the intensity of the light output in a particular wavelength range, the temperature of the bulb, the electrical impedance of the bulb, the voltage drop across the bulb, the current through the bulb or the value of a relationship between two or more of the arc lamp bulb properties just mentioned.

At step 54, the lamp monitoring process 50 loads the threshold property value from storage 32 or memory 33.

At step 55, one or more of the lamp monitoring sensors 12, 14 and 16 senses a current property value of the arc lamp bulb 5 as a current arc lamp bulb property value. The current arc lamp bulb property value may be subject to normalizing for the electrical power or voltage input to the arc lamp bulb. As noted above, the control circuit 20 may acquire current arc lamp bulb property values from more than one of the sensors, and may process such arc lamp property values to calculate a relationship between or among them as the current arc lamp bulb property value.

At step 56, the lamp monitoring process 50 compares the current arc lamp bulb property value with the threshold property value to determine whether the current arc lamp bulb property value meets the threshold property value.

When it is determined in step 56 that the current arc lamp bulb property value meets the threshold property value, the lamp monitoring process 50 advances to step 57, where it generates an end-of-life notification signal. The end-of-life notification signal may indicate that a spare bulb should be obtained. The lamp monitoring process 50 then ends. Alternatively, the lamp monitoring process 50 may return to step 55 via step 58, to be described below. This would allow the lamp monitoring process to continue to sense the current arc lamp bulb property value, and, if the current arc lamp bulb property value were to meet a second threshold property value indicating that the end of the life of the arc lamp bulb is yet closer, the lamp monitoring process could generate a second end-of-life notification signal. The second end-of-life signal could provide a more urgent warning of the imminent need to replace the arc lamp bulb.

When it is determined in step 56 that the current arc lamp bulb property value fails to meet the threshold property value, the lamp monitoring process 50 advances to step 58, which imposes a delay. The lamp monitoring process 50 then returns to step 55, where it senses a new current arc lamp bulb property value.

In the lamp monitoring process 50, a property value of the arc lamp bulb derived from the initial arc lamp bulb property value determined in step 52 was used as the threshold property value. Alternatively, the temporal derivative of a property value of the arc lamp bulb may be used as the threshold property value. A lamp monitoring process 60 that uses the temporal derivative of a property value of the arc lamp bulb as the threshold property value will now be described with reference to FIG. 6B.

At step 61, the lamp monitoring process 60 acquires the threshold property value and stores the threshold property value in storage 32 or in memory 33. In this embodiment, the threshold property value is the value of the temporal derivative of a property value of the arc lamp bulb, i.e., the rate at which the property value changes with time. The threshold property value can be, but is not limited to, the total light output, the spectral distribution of the light output, the intensity of the light output in a particular wavelength range, the bulb temperature, the electrical impedance of the bulb, the voltage drop across the bulb, the current through the bulb or the value of a relationship between two or more of the arc lamp bulb properties just mentioned. Additionally or alternatively, the threshold property value may be the value of the second temporal derivative of such property value of the arc lamp bulb, i.e., the rate at which the temporal derivative of the property value changes with time.

At step 62, the lamp monitoring process 60 loads the threshold property value from storage 32 or memory 33.

At step 63, one or more of the lamp monitoring sensors 12, 14 and 16 senses the current property value of the arc lamp bulb 5 as a current arc lamp bulb property value, and the current arc lamp bulb property value is stored. The current arc lamp bulb property value may be subject to normalizing for the electrical power or voltage input to the arc lamp bulb. As noted above, the control circuit 20 may acquire current arc lamp bulb property values from more than one of the sensors, and may process such current arc lamp bulb property values to calculate a relationship between or among them as the current arc lamp bulb property value that is stored.

At step 64, the lamp monitoring process 60 determines the temporal derivative of the current arc lamp bulb property value from the N most-recently stored instances of the current arc lamp bulb property value. For example, the temporal derivative may be determined from the two, three, four or more recently-stored instances of the current arc lamp bulb property value.

At step 65, the lamp monitoring process 60 compares the temporal derivative of the current arc lamp bulb property value with the threshold property value to determine whether the temporal derivative of the current arc lamp bulb property value meets the threshold property value.

When it is determined in step 65 that the temporal derivative of the current arc lamp bulb property value meets the threshold property value, the lamp monitoring process 60 advances to step 66, where it generates an end-of-life notification signal. The end-of-life notification signal may indicate that a spare bulb should be obtained. After generating the end-of-life notification signal, the lamp monitoring process 60 ends. Alternatively, the lamp monitoring process 60 may return to step 63 via step 67, to be described below, to allow it to continue to monitor the arc lamp bulb, as described above.

When it is determined in step 65 that the current arc lamp bulb property value fails to meet the threshold property value, the lamp monitoring process 60 advances to step 67, which imposes a delay. The delay determines the time between sensing successive instances of the current arc lamp bulb property value. The lamp monitoring process 60 then returns to step 63, where a new current arc lamp bulb property value is sensed.

The lamp monitoring processes 50 and 60 of the invention can be implemented in hardware, software, firmware, or a combination thereof. In the preferred embodiments, the lamp monitoring process is implemented in software that is stored in a memory and that is executed by a suitable instruction execution system.

Figure 6B:
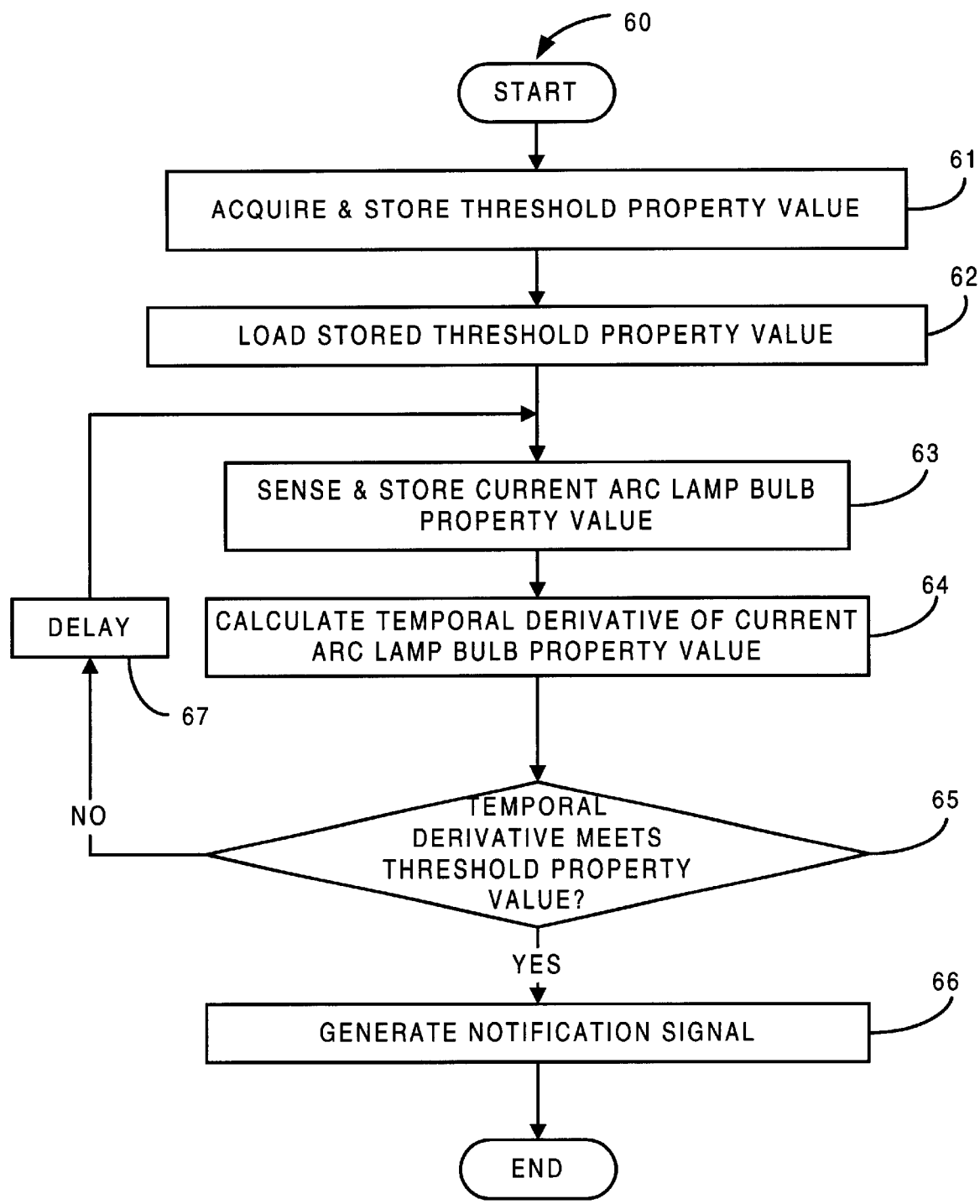
FIG. 6B is a flow chart of a second example of the lamp monitoring process performed in the control circuit shown in FIG. 1.

It should be noted that the flow charts shown in FIGS. 6A and 6B show the architecture, functionality, and operation of possible implementations of the lamp monitoring process software of the control circuit 20. In this regard, each block represents a module, segment, or portion of code, which comprises one or more executable instructions for implementing the specified logical function. It should also be noted that in some alternative implementations, the functions noted in the blocks may occur in an order different from the orders shown in FIGS. 6A and 6B. For example, two blocks shown in succession in FIGS. 6A and 6B may in fact be executed substantially concurrently or the blocks may sometimes be executed in the reverse order, depending upon the function involved.

Moreover, although the above descriptions refer to a current arc lamp bulb property value and a threshold property value, the lamp monitoring processes described above may be performed by sensing more than one current arc lamp bulb property value and comparing more than one current arc lamp bulb property value, or the temporal derivatives thereof, with corresponding threshold property values. The lamp monitoring processes 50 and 60 may also be combined so that one or more current arc lamp bulb property value is sensed, the temporal derivative of one or more of the current arc lamp bulb property values is calculated, and one or more of the current arc lamp bulb property values and the one or more calculated temporal derivative are compared with corresponding threshold values. When more than one current arc lamp bulb property value is sensed, each current arc lamp bulb property value or a temporal derivative thereof is compared with a respective threshold property value. The lamp monitoring process may then generate the notification signal when just one current arc lamp bulb property value, or the temporal derivative thereof, meets its respective threshold property value. Alternatively, the lamp monitoring process may not generate the notification signal until a subset of or all of the current arc lamp bulb property values or temporal derivatives meet their respective threshold property values.

Figure 7A:
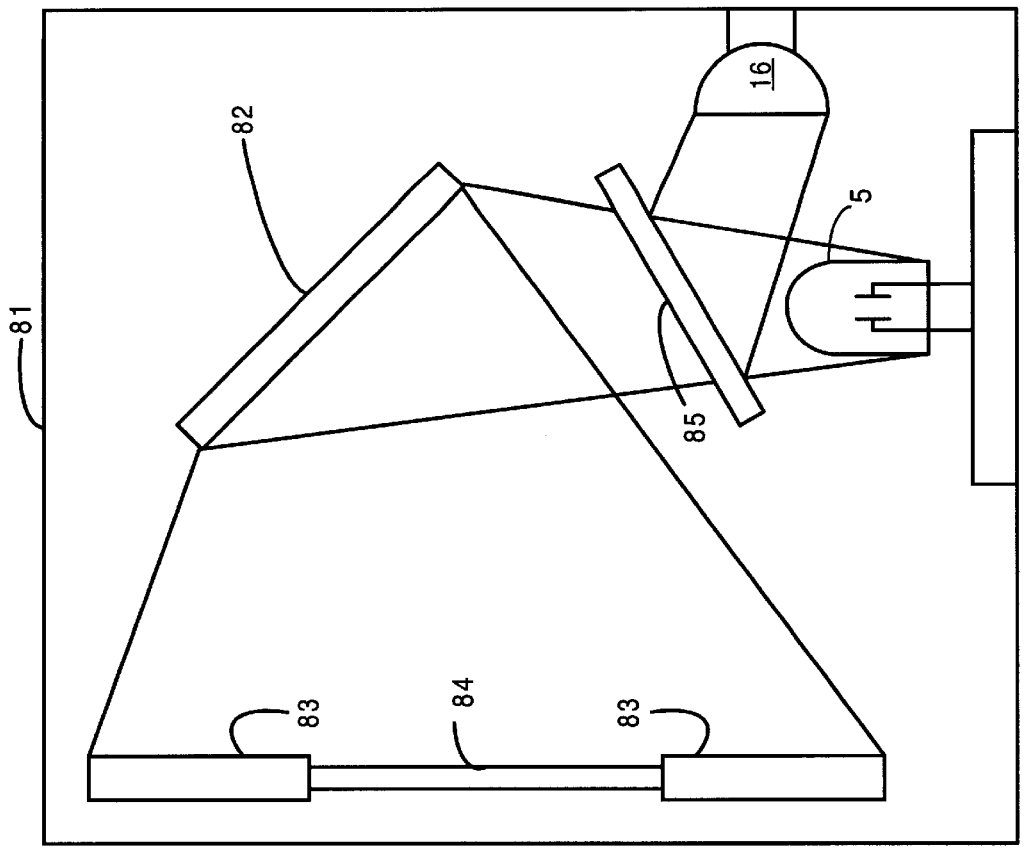
FIGS. 7A and 7B, are examples of possible sensor set-ups in an example projection system.

Illustrated in FIG. 7A is an example of a sensor set-up in a projection system 71. In this example, the sensor 16 is adjacent to the bezel 73 that surrounds the active screen area 74. In this example, arc lamp bulb 5 projects light onto mirror 72. The mirror 72 reflects the light output from arc lamp bulb 5 onto sensor 16, bezel 73 and active screen area 74. The sensor 16 receives a portion of light reflected from mirror 72. Sensor 16 uses this portion of the light to predict the end of the life of arc lamp bulb 5.

Figure 7B:
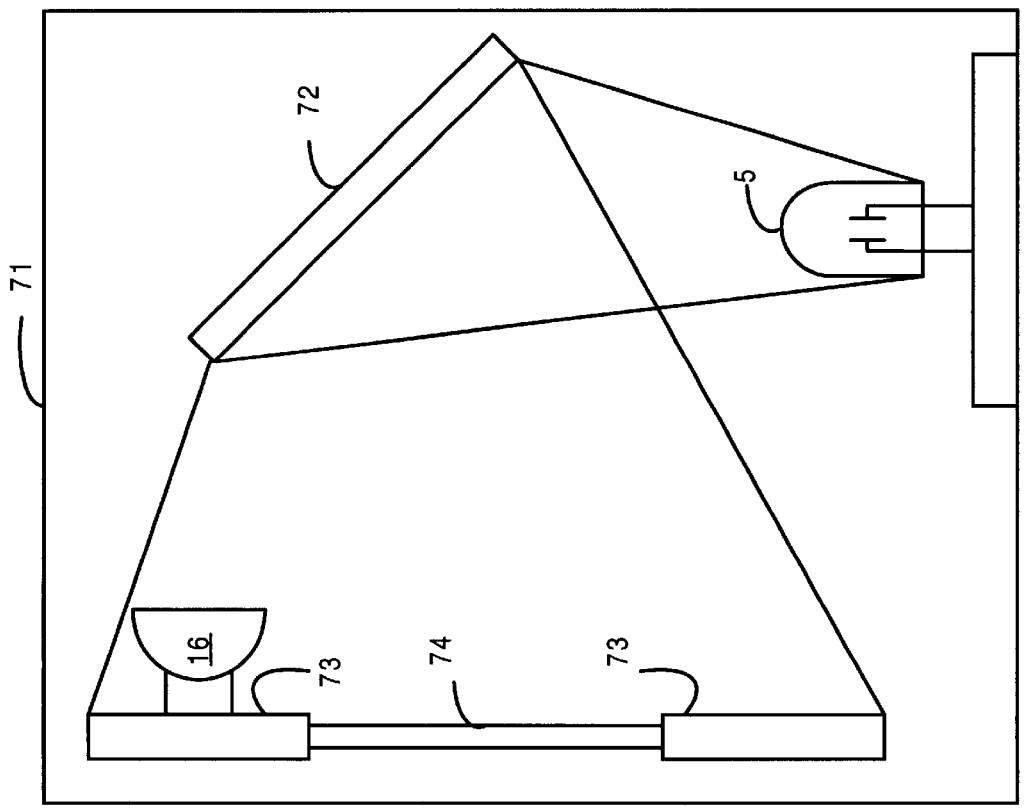

Illustrated in FIG. 7B is another example of a sensor set-up in a projection system 81. In this example, the sensor 16 is located closer to arc lamp bulb 5. A portion of the light generated by arc lamp bulb 5 is reflected by a partially reflecting mirror 85 onto sensor 16. This mirror reflects a small amount of light towards the sensor 16. This allows sensor 16 to monitor arc lamp bulb property values without being in the direct stream of light generated by arc lamp bulb 5. The light not reflected by the partially reflecting mirror 85 projects onto mirror 82. The light output from arc lamp bulb 5 is reflected from mirror 82 onto bezel 83 and active screen area 84. This is also the preferred implementation for a front projection system.

The lamp monitoring processes 50 and 60, described above with reference to FIG. 6A and 6B and which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" can be any medium that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the invention, particularly, any "preferred" embodiments, are merely possible examples of implementations, merely set forth to provide a clear understanding of the principles of the invention. Many variations and modifications may be made to the above-described embodiments of the invention without departing substantially from the scope of the invention. All such modifications and variations are intended to be included herein within the scope of the invention and protected by the following claims.

What is claimed is:

1. Apparatus for monitoring the life of an arc lamp bulb, the apparatus comprising:
    a memory for storing a threshold light output property value;
    an arc lamp bulb property sensor for acquiring a current arc lamp bulb light output property value;
    a control circuit structured to compare said current arc lamp bulb light output property value with said threshold light output property value and to generate an end-of-life notification signal when said current arc lamp bulb light output property value meets said threshold light output property value.

2. The apparatus of claim 1, additionally comprising a warning indicator receiving said end-of-life notification signal.

3. The apparatus of claim 2, wherein said warning indicator indicates that a spare bulb is required.

4. The apparatus of claim 1, wherein said control circuit loads said threshold light output property value from said memory.

5. The apparatus of claim 1, wherein said light output threshold property value is the value of a property selected from the group consisting of the total light output; the spectral distribution of the light output; the light intensity within a particular wavelength range; the value of a relationship between at least two of said total light output, said spectral distribution, and said light intensity in said particular wavelength range; and a temporal derivative of said total light output, said spectral distribution, said light intensity in said particular wavelength range, and said relationship.

6. The apparatus of claim 1, wherein said control circuit is additionally structured to compute said threshold light output property value from an initial arc lamp bulb light output property value.

7. The apparatus of claim 1, wherein:
    said control circuit is additionally structured to compute a temporal derivative of said current arc lamp bulb light output property value; and
    said control circuit is structured to compare said temporal derivative of said current arc lamp bulb light output property value with said threshold light output property value.

8. The apparatus of claim 7, wherein said memory is additionally for storing successive instances of said current arc lamp bulb light output property value.

9. Apparatus for monitoring the life of an arc lamp bulb, the apparatus comprising:
    means for storing a threshold light output property value;
    means for acquiring a current arc lamp bulb light output property value; and
    comparing means for comparing said current arc lamp bulb light output property value with said threshold light output property value to generate an end-of-life notification signal when said current arc lamp bulb property value meets said threshold property value.

10. The apparatus of claim 9, additionally comprising means for generating a warning indication in response to said end-of-life notification signal.

11. The apparatus of claim 10, wherein said warning indicator generating means indicates that a spare bulb is required.

12. The apparatus of claim 9, wherein said comparing means is additionally for loading said threshold light output property value from said storing means.

13. The apparatus of claim 9, wherein said threshold light output property value is the value of a property selected from the group consisting of the total light output; the spectral distribution of the light output; the light intensity within a particular wavelength range; a relationship between at least two of said total light output, said spectral distribution, and said light intensity in said particular wavelength range; and a temporal derivative of said total light output, said spectral distribution, said light intensity in said particular wavelength range, and said relationship.

14. The apparatus of claim 9, additionally comprising means for determining said threshold light output property value from an initial arc lamp bulb light output property value.

15. The apparatus of claim 9, wherein:
    said apparatus additionally comprises means for determining a temporal derivative of said current arc lamp bulb light output property value from successive instances of said current arc lamp bulb light output property value; and
    said comparing means is for comparing said threshold light output property value with said temporal derivative of said current arc lamp bulb light output property value.

16. The apparatus of claim 15, wherein said means for storing is additionally for storing said successive instances of said current arc lamp bulb light output property value.

17. A method for monitoring the life of an arc lamp bulb, the method comprising:
    acquiring a threshold property value; acquiring a current arc lamp bulb light output property value;
    comparing said current arc lamp bulb light output property value with said threshold light output property value; and generating an end-of-life notification signal when said current arc lamp bulb light output property value meets said threshold light output property value.

18. The method of claim 17, additionally comprising generating a warning indication in response to said end-of-life notification signal.

19. The method of claim 17, wherein, in generating said warning indication, said warning indication indicates that a spare bulb is required.

20. The method of claim 17, wherein, in acquiring said threshold light output property value, said threshold light output property value is the value of a property selected from the group consisting of the total light output; the spectral distribution of the light output; the light intensity within a particular wavelength range; a relationship between at least two of said total light output, said spectral distribution, and said light intensity in said particular wavelength range; and a temporal derivative of said total light output, said spectral distribution, said light intensity in said particular wavelength range, and said relationship.

21. The method of claim 17, additionally comprising determining said threshold light output property value from an initial arc lamp bulb light output property value.

22. The method of claim 17, wherein:

said method additionally comprises calculating a temporal derivative of said current arc lamp bulb light output property value from successive instances of said current arc lamp bulb light output property value; and in said comparing and generating steps, said temporal derivative of said current arc lamp bulb light output property value is used in lieu of said current arc lamp bulb light output property value.

* * * * *